Feb. 3, 1925.

1,524,817

F. H. DAY

SELF LOCKING WASHER

Filed March 22, 1924

WITNESSES

INVENTOR
F. H. DAY,

BY

ATTORNEYS

Patented Feb. 3, 1925.

1,524,817

UNITED STATES PATENT OFFICE.

FREDERIC H. DAY, OF ALEXANDRIA, VIRGINIA.

SELF-LOCKING WASHER.

Application filed March 22, 1924. Serial No. 701,149.

*To all whom it may concern:*

Be it known that I, FREDERIC H. DAY, a citizen of the United States, and resident of Alexandria, in the State of Virginia, have invented certain new and useful Improvements in Self-Locking Washers, of which the following is a specification.

My invention relates to improvements in washers and it consists in the combinations, constructions and arrangements herein described and claimed.

An object of the invention is to provide a washer which in addition to being adapted for use to perform the functions of and in the manner of an ordinary one-piece washer or annular spacer, filler or bearing member is adapted to be placed on a bolt shank, piston rod or other rod-like member for the purpose of spacing apart or preventing play between two adjacent elements on the rod like member without there being any necessity of removing the rod like member from a support therefor or for removing either of the adjacent elements from the rod like members preliminarily to placing the washer between such adjacent elements.

A further object of the invention is to provide a washer which comprises a plurality of complementary sections adapted to be assembled into annular form about a rod like member and a novel highly efficient means for securing the complementary sections together so that the split washer will be strong and durable and not likely to be broken or distorted in service.

Other objects and advantages will be apparent from the following description, considered in conjunction with the accompanying drawings, in which—

Figure 1:
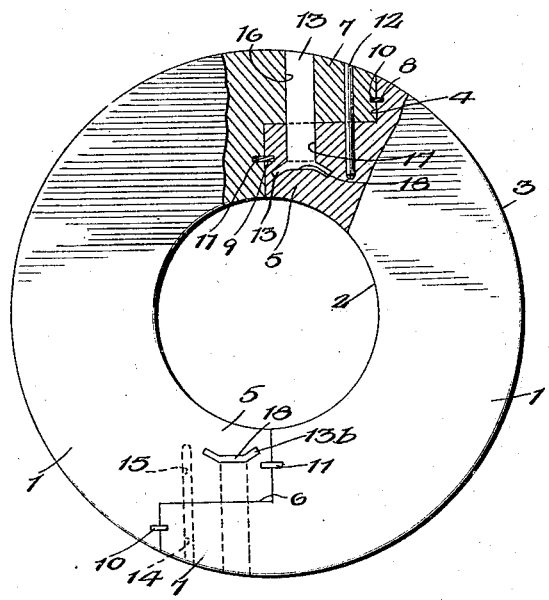
Figure 2:
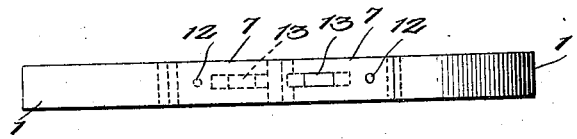
Figure 3:
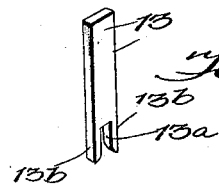
Figure 4:

Figure 1 is a side elevation of the washer embodied in the invention, standing on its edge, a portion of the washer being broken away at a side wall thereof to show to advantage the means for securing meeting ends of the sections of the washer together, Figure 2 is an edge view of the washer, Figure 3 is a perspective view showing one of the fastening elements which is adapted to be used to secure meeting end portions of two sections of the washer together, and Figure 4 is a perspective view of another fastening element which is adapted to be used in conjunction with the fastening element exhibited in Figure 3 to secure the end portions of the washer sections together.

A washer embodying the invention in the form now preferred by me comprises a plurality of complementary similar sections 1, each of which has arcuate and preferably parallel inner and outer walls which respectively are indicated at 2 and 3. The sections 1 when assembled and secured together in the manner to be hereinafter described comprise an annular body. In the form of the device exhibited in the drawings, this annular body is made up of two sections 1 but obviously a greater number of similar complementary sections may be provided without departing from the spirit and scope of the invention as will be apparent from the following description.

Each section 1 is slightly cut away from the outer edge thereof inward at one end thereof as indicated at 4, thus defining a forwardly extending inner edge portion 5 at said one end of the section. The section is partially cut away from its inner edge outward at the other end of the section as indicated at 6, thus defining a forwardly extending portion 7 at the outer edge of the section at the last named or second end thereof. The cutting away of each section at 4 adapts that section for the reception of the projecting portion 7 of the other section when the two sections are arranged in position to complement each other and to form an annular body, each section also being adapted as a result of the cutting away thereof at 6 for the reception of the extending inner edge portion 5 of the other section. With the arrangement just described, the end walls of the projections 5 of the two complementary sections 1 will lie in a plane which extends diametrically of the annular body which is formed of the sections 1 when the latter are assembled. The projections 5 and 7 at the meeting ends of the two complementary sections will be in radially overlapped relation.

The sections 1 are held temporarily against displacement from position to complement each other by means of small dowel pins 8 and 9 which respectively extend from the end walls of the projections 7 and 5 of the sections 1 and are projected into recesses 10 and 11 respectively in the confronting walls of the cut away portions 4 and 6, when the sections 1 are moved to assembled position as shown in Figures 1 and 2. The sections 1 are securely and more permanently held against displacement from assembled position and against relative movement in any direction through the agency of pins 12 and 13 respectively. Each pin 12 has a driving fit with a bore 14 extending through each projection 7 from the outer wall to the inner wall thereof and with a pocket 15 which is formed to extend into the overlapped projection 5 in position to exactly register at its outer end with the inner end of the pocket 15 when the sections 1 are in assembled position. Each fastening pin 13 has an elongated flat body having a notch 13$^a$ in one end thereof, thus defining a pair of spaced apart prongs 13$^b$ at said one end of the body of the fastening element, the prongs 13$^b$ preferably having the outer ends thereof beveled reversely from the inner walls of the prongs so that the prongs will tend to diverge when moved forcibly against a fixed member.

Each fastening pin 13 has a driving fit with a socket which comprises a portion 16 extending through one of the projections 7 from the outer wall thereof to the inner wall of the projection and an inner portion 17 which is formed in the overlapped projection 5 and is in exact register at its outer end with the inner end of the portion 16 of the socket when the sections 1 are in assembled position. Each socket 16—17 conforms in cross sectional contour to that of the pin 13 at all points along the length of the socket except at the inner end of the portion 17 thereof. The portion 17 of each socket 16—17 is intercepted at its inner end by a substantially arcuate slot which opens through the side walls of the projection 5 in which the portion 17 of the socket is formed and is of greater length from one end thereof to its opposite end than the distance between the outer walls of the prongs 13$^b$ of each fastening pin 13. With this arrangement, a substantially convex surface at the bottom of each socket 16—17 is provided for engaging with the prongs 13$^b$ when one of the pins 13 is driven into the sockets 16—17, whereby the prongs 13$^b$ will be spread and will be forced into the end portions of the slot 18, thus locking the pins 13 against withdrawal from the sockets 16—17. Since the ends of the slot 18 extend outwardly and downwardly from the inner ends of the sockets 16—17, it will be obvious that the pins 13 will be effectively held in fully driven position in the sockets 16—17. The outer ends of the pins 12 and 13 may be curved to conform to the curvature of the outer wall of the annular body which is formed of the sections 1 and the pins 12 and 13 are of such length as to position the outer ends thereof continuous with the outer peripheral wall of the annular body when the pins are in driven position.

From the foregoing description of the various parts of the device, the operation thereof may be readily understood. The sections 1 and the pins for securing the sections in assembled position may be of any suitable material. The annular body which is comprised of the sections 1 secured together may be of any desirable size.

As hereinbefore stated, the washer embodying the invention is adapted for use in the manner of an ordinary washer as well as being capable of being used to perform the functions for which an ordinary washer is incapable of use. For example, the washer embodying the invention is well adapted for use as a hub liner for locomotive engine trucks or trailer wheels. The use of washers embodying the invention as hub liners will insure the proper positioning of the engine body and journal boxes on the axles and in respect to the wheels of the engine, thus tending to obviate undue wear on the brasses of the journals and also tending to prevent any binding action between the journal boxes and the wheels of the engine, such as frequently takes place in an engine of ordinary construction. The washers can be installed as hub liners without any considerable skill, if any, being required on the part of a workman and without there being any necessity of first removing or displacing any of the parts of the engine with which the washers will be associated when such washers are used as hub liners.

Obviously, my invention is susceptible of embodiment in forms other than that illustrated in the accompanying drawings and I therefore consider as my own all modifications and adaptations of the form of the device herein described as fairly fall within the scope of the appended claims.

I claim:—

1. A washer comprising two complementary similar sections, each having a cut away portion at one end thereof at the outer edge thereof thus defining a projecting portion at the inner edge thereof at said one end, and each having a cut away portion at the inner edge thereof at its other end, thus defining a projecting portion at the outer edge thereof at said second end thereof, the outer projecting portion of each section being adapted to fit the outer cut-away portion of the other section and the inner projecting portion of each section being adapted to fit the inner cut-away portion of the other section whereby the outer and inner projecting portions at meeting ends of the sections will be disposed in radially lapped relation, said lapped portions having sockets formed therein, and pins engaged with said sockets for holding the lapped portions against displacement in respect to each other, said inner projecting portions having transverse slots intersecting said sockets at the inner ends of the latter, the ends of said slots extending outwardly and downwardly from the inner ends of the sockets and the pins which are engaged with said sockets having prongs at their inner ends adapted to enter said laterally and inwardly turned end portions of the slots, and dowel pins carried by the projecting portions of said sections and each adapted to enter a recess in the confronting wall of the other section for holding said sections in position to complement each other until said first named pins can be engaged with said sockets.

2. A washer comprising two complementary similar sections, each having a cut away portion at one end thereof at the outer edge thereof thus defining a projecting portion at the inner edge thereof at said one end, and each having a cut away portion at the inner edge thereof at its other end, thus defining a projecting portion at the outer edge thereof at said second end thereof, the outer projecting portion of each section being adapted to fit the outer cut away portion of the other section and the inner projecting portion of each section being adapted to fit the inner cut away portion of the other section whereby the outer and inner projecting portions at meeting ends of the sections will be disposed in radially lapped relation, said lapped portions having sockets formed therein, and pins engaged with said sockets for holding the lapped portions against displacement in respect to each other, said inner projecting portions having transverse slots intersecting said sockets at the inner ends of the latter, the ends of said slots extending outwardly and downwardly from the inner ends of the sockets and the pins which are engaged with said sockets having prongs at their inner ends adapted to enter said laterally and inwardly turned end portions of the slots.

FREDERIC H. DAY.